March 19, 1963     F. PAPKE     3,081,664
BLOCK TYPE PHOTOGRAPHIC VIEWFINDER WITH PARALLAX COMPENSATION
Filed Jan. 16, 1961     2 Sheets-Sheet 1

INVENTOR
Friedrich Papke
By Blum, Moscovitz, Friedman & Blum
Attorneys

March 19, 1963    F. PAPKE    3,081,664
BLOCK TYPE PHOTOGRAPHIC VIEWFINDER WITH PARALLAX COMPENSATION
Filed Jan. 16, 1961    2 Sheets-Sheet 2

INVENTOR.
Friedrich Papke
BY

ATTORNEYS

United States Patent Office 3,081,664
Patented Mar. 19, 1963

3,081,664
BLOCK TYPE PHOTOGRAPHIC VIEWFINDER WITH PARALLAX COMPENSATION
Friedrich Papke, Braunschweig, Germany, assignor to Voigtlander A.G., Braunschweig, Germany, a corporation of Germany
Filed Jan. 16, 1961, Ser. No. 82,937
Claims priority, application Germany Jan. 20, 1960
15 Claims. (Cl. 88—1.5)

This invention relates to viewfinders for photographic cameras and, more particularly, to such viewfinders incorporating novel and improved means for parallax compensation.

In the photographic viewfinder art, it is common to design viewfinders for parallax compensation, in order to coordinate the image appearing in the viewfinder with respect to the distance of the object from the camera. A well-known expedient for effecting this is to provide for adjustment of the entire viewfinder with respect to the camera. However, this expedient not only is frequently undesirable for various reasons but also introduces structural complications, particularly in the case of viewfinders that are built into the camera cover or hood.

In another known expedient, the view finder is divided, intermediate its ends, along a plane perpendicular to its optical axis, and one part of the finder is fixedly secured to the camera while the other part is mounted on a special retaining device by means of which it may be shifted, relative to the fixedly mounted part, in a direction perpendicular to the optical axis. In arrangements of this type, it is also known to couple the movable part of the viewfinder with the means for adjusting the focal length of the objective lens system, in order to obtain automatic parallax compensation of the viewfinder with respect to the distance between the object and the objective lens.

However, viewfinders of this latter type lose part of the advantages of viewfinders devised as solid glass blocks, and wherein the path of the light rays through the viewfinder is entirely in glass or other solid transparent material. Such a block-shaped or solid design for a viewfinder is very frequently employed in the case of the so-called "Albada" viewfinders as, in this case, in addition to the advantage of providing a clearly focused viewing frame in the field of the viewfinder, there is the further advantage of maintaining the loss of entering light at a very low value. Additional, a block-type construction, in Albada viewfinders, avoids troublesome reflection phenomena, as well as other disadvantages of so-called open type viewfinders. When a block-type Albada viewfinder is divided into two parts, in order to provide for parallax compensation in accordance with the arrangement mentioned above, there are introduced the disadvantages of loss of available light and the presence of additional reflections on the plane faces at the interface or interspace between the two relatively movable parts of the viewfinder. Hence, the expedient, of providing parallax compensation by making the parts of the viewfinder relatively movable, is not fully satisfactory in the case of Albada viewfinders, and particularly in the case of block type Albada viewfinders.

In accordance with the present invention, a block type viewfinder, preferably of the Albada type, is provided in which parallax compensation can be readily effected without any risk of loss of available light or of increasing reflection phenomena to an appreciable degree. More particularly, the viewfinder body is divided into two parts along a plane perpendicular to the optical axis of the viewfinder, in the known manner, while, at the same time, the break or interspace between the two body parts of the viewfinder is filled with a deformable optically transparent medium or composition. Such a medium may comprise, for example, either a transparent liquid or a viscous transparent composition filling the interspace between the inner ends of the body parts. If this liquid or the viscous transparent composition has the same refraction index as do the two body parts of the viewfinder, any reflection phenomena at the interspace, and any loss of light, are obviated. The filler is retained in the interspace by means of a preferably deformable, plastic and elastic casing or sleeve which peripherally seals and encloses the interspace and has a good seal with the two body parts of the viewfinder.

For an understanding of the principles of the invention, reference is made to the following description of typical embodiments thereof as illustrated in the accompanying drawings. In the drawings.

Figure 1:
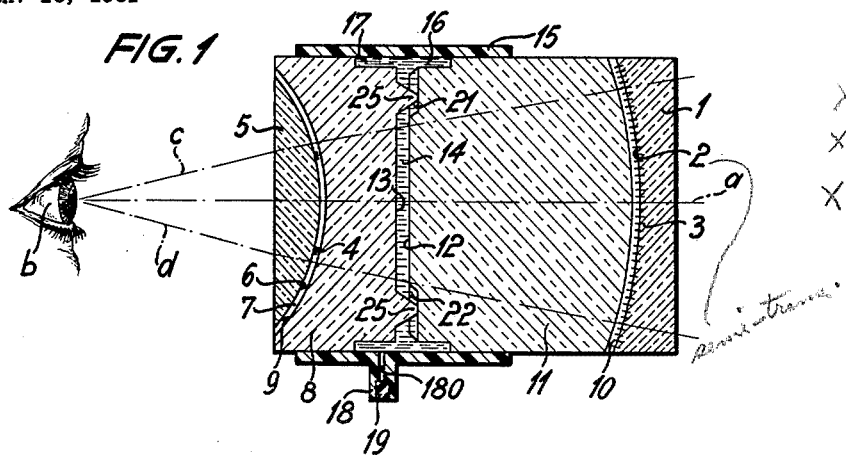
FIG. 1 is a longitudinal sectional view through a block type Albada viewfinder embodying the invention.

Referring to FIG. 1, the block type Albada viewfinder shown therein includes a front, light ray entry window, or objective member in the form of a plano-concave lens 1 whose concave inner surface 2 carries the partially permeable mirror 3 providing an image of the picture limiting frame 4 at substantially infinity, the picture limiting frame 4 being substantially in the focal plane of the mirror 3. Picture limiting frame 4 is disposed on the convex inner surface 6 of the eye-piece or ocular member 5, which is in the form of a plano-convex lens whose plane outer surface faces the observer's eye b. Convex surface 6 of member 5 is cemented into the concave outer end surface 9 of a glass block or body part 8 by means of transparent cement indicated at 7. Similarly, the other part of the usual intermediate glass block or body, designated as 11, has a convex outer or forwardly facing end surface which is cemented to the concave inner surface of member 1 by cement indicated at 10, the cement being a transparent optical cement.

Figure 2:
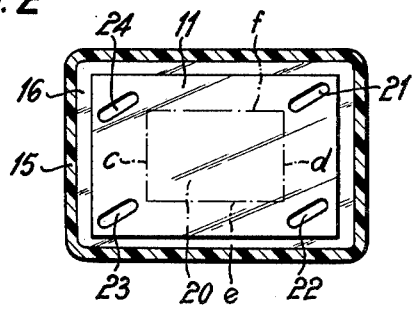
FIG. 2 is a transverse sectional view of the viewfinder shown in FIG. 1, the section being taken along the plane of the inner end of the front body part of the viewfinder.

While a particular form of block type Albada finder has been illustrated in FIGS. 1 and 2, it should be understood that the block type Albada finder can take any one of the many forms known to the art without departing from the scope of the invention. It is, further, immaterial to the principles of the invention whether, as in the case of the particular example shown in FIGS. 1 and 2, the magnification ratio of the viewfinder is 1:1 or whether it is greater or larger than this ratio, as in accordance with the "Newton" or the "Galilei" principles. It is furthermore immaterial to the principles of the invention whether the surface carrying the frame 4 is curved or whether it is plane. Also, while the finder body parts are described as formed of glass, other solid transparent material such as a suitable plastic composition material, may be used therefor.

The plane inner surface 12 of the block or body part 11 is separated from the plane surface 13 of the block or body part 8 by a relatively narrow interspace 14. In the drawings, the dimensions of this space have been greater exaggerated in order to clarify the principles of the invention. This interspace 14 is filled with a transparent liquid or with a transparent viscous material. The liquid used may be either water or alcohol, and the viscous material could be a fatty material, a resin, or the like. The index of refraction of the filler should, as much as practically possible, coincide with the index of refraction of the solid body parts 8 and 11. In particular, the difference between the index of refraction of the filler and that of the solid body parts 8 and 11 should not exceed two units in the first decimal position.

For example, in accordance with the invention it has been found that, where water was used as the filler and has an index $n=1.33$, that the index $n$ for the glass should equal 1.52. In the case of a flint glass having a high refraction index, for example $n=1.64$, the filler should be an alcohol with an index of refraction of $n=1.50$.

To retain the filler within the interspace 14, the interspace is peripherally sealed as by a closure sleeve or packing 15 of plastic and elastic material which embraces and is intimately sealed to the body parts 8 and 11. The body parts 8 and 11 are further provided with offsets, recesses or tapered portions 16 and 17 adjacent the plane of separation to prevent any injury to the retainer 15, which might occur due to relative movement of parts 8 and 11 during parallax compensation.

The amplitude of mutual displacement of the parts 8 and 11 is governed by the magnification of the mirror system of the viewfinder, as well as by the amount of parallax to be compensated. In turn, this is governed by the manner in which the viewfinder is built-in into the camera. In the case of conventional types of design, tests have indicated that the amplitude of mutual displacement should be from 0.4 to 2.0 mm. The retainer 15 could be provided with suitable means for effecting separation of the parts 8 and 11.

The packing ring 15 is provided with a nipple 18, having an aperture 180, whereby the filling material may be introduced into the interspace 14. Nipple 18 may, for example, be welded to the retaining ring 15. After the interspace 14 has been filled with the required amount of filler material, the nipple 18 is sealed, as indicated at 19.

The optical axis of the viewfinder is indicated at $a$, while the broken lines $c$ and $d$ indicate the limits of the range of vision through the viewfinder, or of the cone of light rays reaching eye $b$ through the viewfinder.

It is preferable to provide the interspace 14 at a position closer to the eye $b$ than to the ray entry surface or front of the viewfinder. By so doing, it is possible to provide the inner ends 12 and 13 of the body parts with mutually cooperable guiding means, spacers, or the like which lie outside the viewing limits indicated by the broken lines $c$ and $d$. To prevent friction between the faces 12 and 13 during relative adjustment of the inner and outer sections of the viewfinder for parallax compensation, means are preferably provided maintaining these faces separated by a predetermined amount. FIG. 2, in combination with FIG. 1, illustrates one type of spacing and separating means.

Referring to FIG. 2, the limits of the range of view through the viewfinder are indicated by the broken line rectangle 20, this field of view being limited by the peripheral rays $c$, $d$, $e$ and $f$. Four grooves, 21 through 24, are ground into the plane inner end face of the body part 11. Correspondingly, the block part 8 has serrations, projections, or tips 25 on its inner place face 13, and these projections seat in the grooves 21 through 24. The projections 25 have a height somewhat greater than the depth of the grooves 21 through 24, and thereby provide an effective pre-set spacing between the faces 12 and 13. In addition, by their engagement in the grooves 21 through 24, the projections 25 assure proper relative guiding of the body parts 8 and 11 during relative movement thereof for parallax compensation.

In the particular arrangement illustrated, the two parts of the finder are intended to be shifted in two mutually perpendicular lateral directions. For this purpose, the grooves 21 through 24 extend at an acute angle to the optical axis of the viewfinder, and thereby parallax both in elevation and of a lateral nature can be compensated. If the viewfinder is to be mounted directly above the optical axis of the camera objective, the grooves 21 through 24 would be arranged to extend vertically rather than obliquely.

Figure 3:
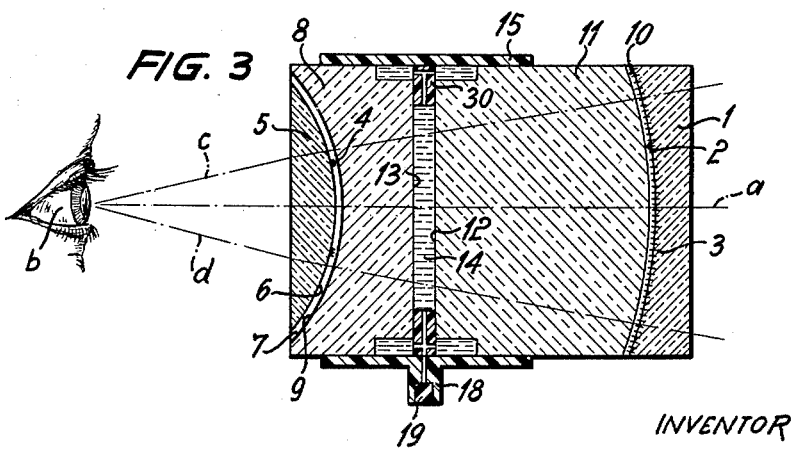
FIG. 3 is a view similar to FIG. 1, illustrating another embodiment of the invention.

The embodiment of the invention shown in FIG. 3 is essentially the same as that shown in FIGS. 1 and 2 with the exception that a different arrangement is provided for assuring proper spacing of the inner end faces 12 and 13 of the body parts 11 and 8, respectively, from each other. In this latter embodiment of the invention, an insert 30, shaped generally in the form of an open rectangular diaphragm or frame, is interposed between the inner ends 12 and 13. The surfaces of diaphragm 30 engaging the surfaces 12 and 13 are preferably undulated or rippled so that the filler in the interspace 14 may move freely, during parallax compensation in which part 11 is shifted relative to part 8, without any marked obstruction, and also act as a lubricant.

Proper guidance of movable part 11 relative to fixed part 8 can be advantageously obtained by means of additional anchoring and guiding means not shown here, and which may be secured to the camera and to the relatively fixed part of the viewfinder. For example, guiding shoes, springs, pivoted levers, and similar elements could be used for guiding the two parts in their movement relative to each other, with the movable part sliding in the guiding means in the usual manner, such as by milled heads, levers, eccentrics, screws, etc. The parts could be proportioned and selected in accordance with the amplitude of relative displacement of the two parts of the viewfinder.

Figure 4:
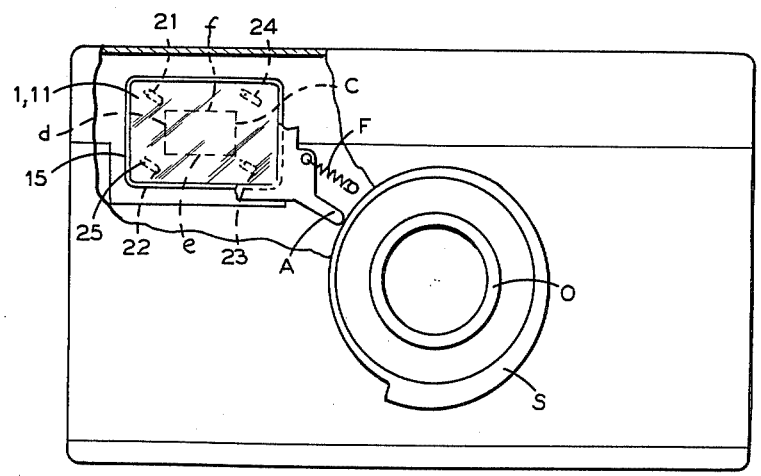
FIG. 4 is a front elevational view, partly broken away, of a photographic camera incorporating the viewfinder of the invention and illustrating the parallax adjustment coupling between the objective lens and a displaceable element of the viewfinder.

FIG. 4 illustrates a parallax coupling mechanism interposed between the objective lens and the viewfinder and of the general type shown, for example, in Leitz U.S. Patent 2,157,547. In FIG. 4, the same reference characters have been used to designate the same parts as in FIGS. 1, 2 and 3. The adjustment is shown, by way of example, as effective upon the parts 1 and 11 of the viewfinder, although it will be understood that it could equally be effective to adjust the parts 5 and 8 while maintaining the parts 1 and 11 stationary.

The broken line $c$, $d$, $e$, $f$ illustrates the position of the adjustable parts 1 and 11 when the objective O is set for infinity in the usual manner, as by rotation thereof. The objective O is provided with a cam S having a high terminal part and a low terminal part. A projection or lug A, secured to the finder parts 1 and 11, bears against the surface of the cam S, and is biased into such engagement by a tension spring F. With the objective lens set to infinity as illustrated in FIG. 4, the projection A is engaged with the low part of the cam S so that spring F biases the finder parts 1 and 11 into the position which is nearest to the objective axis. When the objective O is so adjusted that a higher part of the cam S is engaged with the lug or projection A, the parts 1 and 11 will be shifted to a position which is further displaced from the axis of the objective. This causes a displacement of the peripheral rays in the sense of parallax compensation.

While, in the particular arrangement illustrated in FIG. 4, the parts 5 and 8 are maintained stationary while the parts 1 and 11 are adjustable, it will be understood that this set of conditions could be reversed with the parts 5 and 8 being made adjustable by the cam 7 and the lug A and with the parts 1 and 11 being fixedly positioned.

While parts of the viewfinder have been referred to as formed of glass, it should be understood that such parts may, if necessary or desirable, be made of transparent plastic composition material, without any effect on the efficiency of the parallax compensation of the viewfinder or without departing from the principles of the invention.

While specific embodiments of the invention have been shown and described in detail to illustrate the application of the principles of the invention, it will be understood that the invention may be embodied otherwise without departing from such principles.

What is claimed is:

1. In a block type photographic viewfinder in which the path of light rays through the viewfinder is entirely through solid transparent material, and of the type in which the transparent viewfinder body is divided, intermediate its ends and along a plane perpendicular to its optical axis, into two body parts relatively adjustable parallel to said plane for parallax compensation, said body parts having facing substantially parallel inner end surfaces perpendicular to the optical axis and spaced axially from each other to form an interspace therebetween: the improvement comprising a sleeve of elastically deformable material extending around and closely embracing said body parts adjacent their inner end surfaces and extending an appreciable distance axially outwardly over each body part to form a liquid-tight seal therewith, said sleeve peripherally completely enclosing said interspace; an optically transparent liquid, having an index of refraction substantially equal to that of said body parts, completely and constantly filling said interspace and retained therein by said sleeve; said sleeve, due to its elastic deformability, providing for relative displacement of said body parts, in a direction perpendicular to the optical axis, for parallax compensation.

2. A photographic viewfinder improvement, as claimed in claim 1, in which the difference between the index of refraction of said optically transparent liquid and the index of refraction of said body parts does not exceed two units in the first decimal position.

3. A photographic viewfinder improvement, as claimed in claim 1, in which said sleeve is formed with a filling opening; and means sealing said filling opening.

4. A photographic viewfinder improvement, as claimed in claim 1, in which said two body parts, adjacent their inner end surfaces, are reduced in lateral dimensions to provide clearance with said sleeve during relative movement of said two body parts.

5. A photographic viewfinder improvement, as claimed in claim 1, including spacer means maintaining the facing inner ends surfaces of said body parts in a predetermined spaced relation.

6. A photographic viewfinder improvement, as claimed in claim 5, in which said plane is located nearer to the light ray exit end of said viewfinder than to the light ray entry end thereof; said spacer means being disposed laterally outside the limits of the converging path of light rays entering the viewfinder and passing therethrough to the eye of an observer.

7. A photographic viewfinder improvement, as claimed in claim 5, in which said spacer means comprise projections on one of said inner end surfaces engaging recesses in the other of said inner end surfaces, the height of said projections being in excess of the depth of said recesses by the amount of such predetermined spacing.

8. A photographic viewfinder improvement, as claimed in claim 7, in which said recesses comprise a plurality of relatively elongated and spaced substantially parallel grooves.

9. A photographic viewfinder improvement, as claimed in claim 5, in which said spacing means comprises an open frame disposed between and in engagement with said inner end surfaces.

10. A photographic viewfinder improvement, as claimed in claim 9, in which the surfaces of said frame engaging said inner end surfaces are formed with portions spaced from said inner end surfaces, whereby said optically transparent liquid may enter between portions of said frame and said inner end surfaces to act as a lubricating medium.

11. In a photographic camera, an objective lens, and a block type Albada viewfinder in which the path of light rays through the viewfinder is entirely through solid transparent material and of the type in which the transparent viewfinder body is divided, intermediate its end and along a plane perpendicular to its optical axis, into two body parts relatively adjustable parallel to said plane for parallax compensation, one of said body parts having an outer end surface forming a light entry window and carrying a concave partially light permeable mirror facing the other body part, the other body part having an outer end surface forming a light exit window and carrying a frame positioned in substantially the focal plane of said mirror for imaging by the latter at substantially infinity in the field of view through the viewfinder, said body parts having facing substantially parallel inner end surfaces perpendicular to the optical axis and spaced axially from each other to form an interspace therebetween, the improvement comprising: a sleeve of elastically deformable material extending around and closely embracing said body parts adjacent their inner end surfaces and extending an appreciable distance axially outwardly over each body part to form a liquid-tight seal therewith, said sleeve peripherally completely enclosing said interspace; optically transparent liquid, having an index of refraction substantially equal to that of said body parts, completely and constantly filling said interspace and retained therein by said sleeve; one of said body parts being fixed relative to said camera and the other body part being movable relative thereto; and projections on one of said inner end surfaces engaged in relatively elongated spaced and substantially parallel grooves on the other of said inner end surfaces; the height of said projections exceeding the depth of said grooves to provide a predetermined spacing of said inner ends; said sleeve, due to its elastic deformability, providing for relative displacement of said body parts, in a direction perpendicular to the optical axis, for parallax compensation, and said projections and grooves cooperatively guiding said body parts, during relative movement of said two body parts.

12. In a camera as claimed in claim 11: said viewfinder being mounted above the optical axis of said objective lens; said grooves extending obliquely in the same direction at an acute angle to the vertical plane including the optical axis of said objective; whereby, upon relative movement of said two body parts, the parallax is compensated simultaneously for both vertical aberration and lateral aberration.

13. In a camera as claimed in claim 11: said viewfinder being mounted vertically above the optical axis of said objective; said grooves extending parallel to the vertical plane including the optical axis of said viewfinder and the optical axis of said objective.

14. In a camera as claimed in claim 11: focal length adjusting means operatively associated with said objective lens; and means coupling said focal length adjusting means to the relatively movable body part for conjoint adjustment of the focal length and of said relatively movable body part.

15. A photographic viewfinder improvement as claimed in claim 1, in which one of said body parts is relatively fixed and the other body part is relatively movable; and means adjustably supporting the relatively movable body part on said fixed body part.

References Cited in the file of this patent
UNITED STATES PATENTS 2,317,988   Forssberg _____ May 4, 1943

FOREIGN PATENTS 187,271   Great Britain _____ Oct. 10, 1922
202,442   Austria _____ Mar. 10, 1959